United States Patent [19]
Belcher
[11] 4,403,388
[45] Sep. 13, 1983

[54] AUTOMATIC PALLET-MAKING MACHINE AND METHOD

[76] Inventor: Roy L. Belcher, 5434-88th St. SW., Everett, Wash. 98204

[21] Appl. No.: 262,397
[22] Filed: May 11, 1981

Related U.S. Application Data

[63] Continuation-in-part of Ser. No. 131,405, Mar. 17, 1980, abandoned.

[51] Int. Cl.³ .............................................. B23P 19/00
[52] U.S. Cl. ........................................ 29/429; 29/432; 29/798; 227/7; 227/40; 227/48; 227/50
[58] Field of Search .................... 29/432, 432.1, 432.2, 29/798, 799, 429, 430; 227/5, 7, 39, 40, 48, 50, 101, 102, 103, 104

[56] References Cited

U.S. PATENT DOCUMENTS

| | | | |
|---|---|---|---|
| 2,019,990 | 11/1935 | Newhouse | 227/104 |
| 3,207,403 | 9/1965 | Stoddard et al. | 227/101 |
| 3,591,067 | 7/1971 | Vial | 227/100 X |
| 3,606,130 | 9/1971 | De Lamar et al. | 227/50 X |
| 3,706,408 | 12/1972 | Burch | 227/100 X |
| 3,763,547 | 10/1973 | Blakeslee | 29/772 X |
| 3,945,549 | 3/1976 | Calson | 227/101 X |
| 4,039,112 | 8/1977 | Schultz | 227/40 |
| 4,168,566 | 9/1979 | Streckert | 29/772 X |
| 4,204,624 | 5/1980 | Gunn et al. | 227/50 X |

*Primary Examiner*—Charlie T. Moon
*Attorney, Agent, or Firm*—Seed, Berry, Vernon & Baynham

[57] ABSTRACT

A pallet is automatically assembled and nailed together on a horizontally reciprocating carrier. The carrier moves in a forward direction beneath a slat dispenser. A first series of one-way trip dogs mounted on the carrier successively removes the bottom slat from a stack of slats held by a dispenser to deposit a series of slats onto the carrier to form the bottom deck of a pallet. The carrier has stringer engagement levers which engage the ends of a series of stringers held in dispensers. The carrier reverses direction after deposit of the bottom series of slats and each stringer engagement lever pulls a stringer from the dispenser with each stringer positioned transversely to the previously dispensed slats. As the carriage moves in the reverse direction, another series of one-way trip dogs mounted on the carrier successively dispenses a second series of slats to form the top deck of the pallet. The carrier with the laid-up pallet next moves to a nailing station where nailers automatically fasten the top and bottom slats to the stringers. The carrier then moves to a ratcheted bottom-stacking device which removes a nailed pallet from the carrier and adds that pallet to the bottom of a vertical stack of pallets.

27 Claims, 19 Drawing Figures

AUTOMATIC PALLET-MAKING MACHINE AND METHOD

DESCRIPTION

CROSS-REFERENCE TO RELATED APPLICATION

This application is a continuation-in-part of copending United States Patent Application Ser. No. 131,405 filed Mar. 17, 1980, now abandoned.

TECHNICAL FIELD

This invention relates to pallet-making machines and to methods for automatically assembling and stacking pallets.

BACKGROUND ART

Wooden pallets for transporting and storing goods are widely used in commerce and industry. A pallet is constructed by nailing a series of slats to transversely positioned stringers. Pallets are sometimes manually fabricated, but, for large-scale production, semiautomatic fabrication is more economical.

Various types of semiautomatic systems have been used to assist in assembling the components of wood pallets. Many systems require manual positioning of the slats and stringers prior to their semiautomatic nailing together. These systems usually nail only one side of the pallet. To assemble a double-sided pallet, the pallet must be flipped over after nailing one side. None provide automatic stacking of completed pallets.

DISCLOSURE OF INVENTION

It is an object of the invention to provide an automatic pallet-making machine which provides for inexpensive, automatic assembly of double-sided wooden pallets.

It is another object of the invention to provide a pallet-making machine which automatically stacks completed pallets.

These objects are achieved by providing a machine and a method for automatically assembling wooden pallets on a horizontally movable reciprocating carrier. The carrier is adapted for horizontal movement along a set of rails. First, as the carrier moves in a forward direction, a series of slat engagement means remove, respectively, the lowest slat in a vertical stack and position the slats in spaced relation on the carrier to form the bottom deck of the pallet. Second, the carrier moves to a position where stringer engagement trip-levers engage the ends of a series of stringers held in a magazine. When the carrier reverses, the trip-levers dispense the stringers. Third, the carrier passes through the slat dispenser in the reverse direction, where another series of slats is dispensed to form the top deck of the pallet. Fourth, the carrier moves through an automatic nailing station where the top and the bottom slats are nailed to the stringers by automatic nailing means. Finally, a vertical stacker automatically removes the pallet from the carrier and adds it to a stack.

BEST MODE FOR CARRYING OUT THE INVENTION

Figure 1:
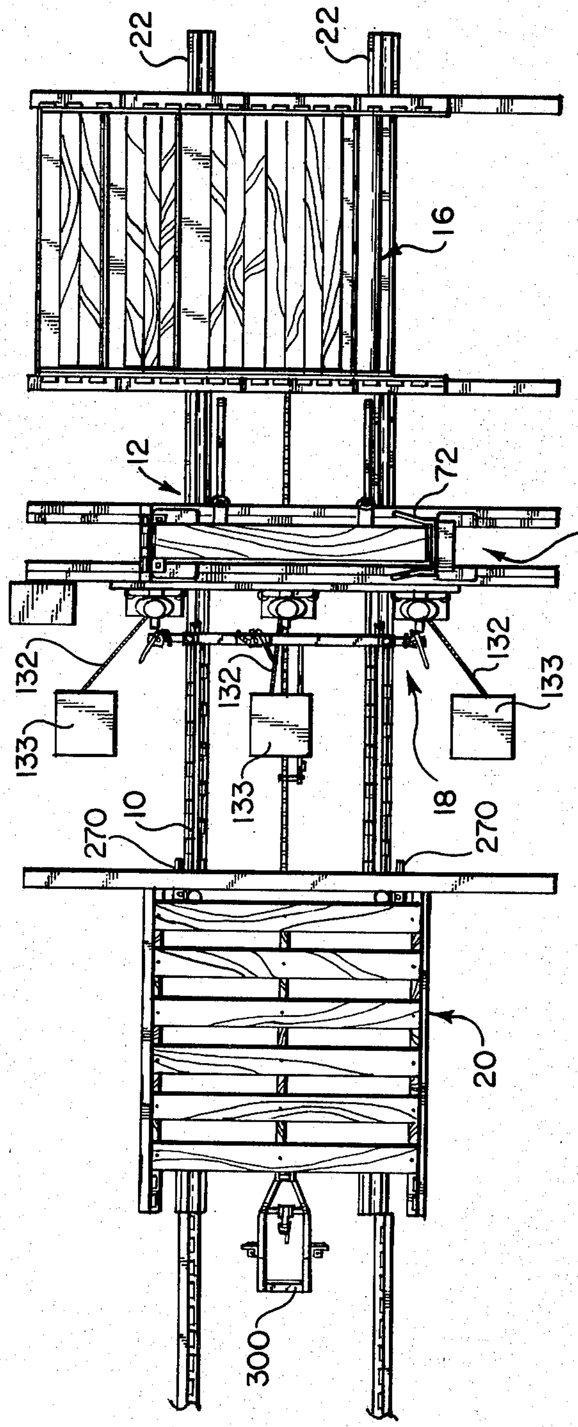
FIG. 1 is a plan view of the automatic pallet-making machine according to the invention.
Figure 2:
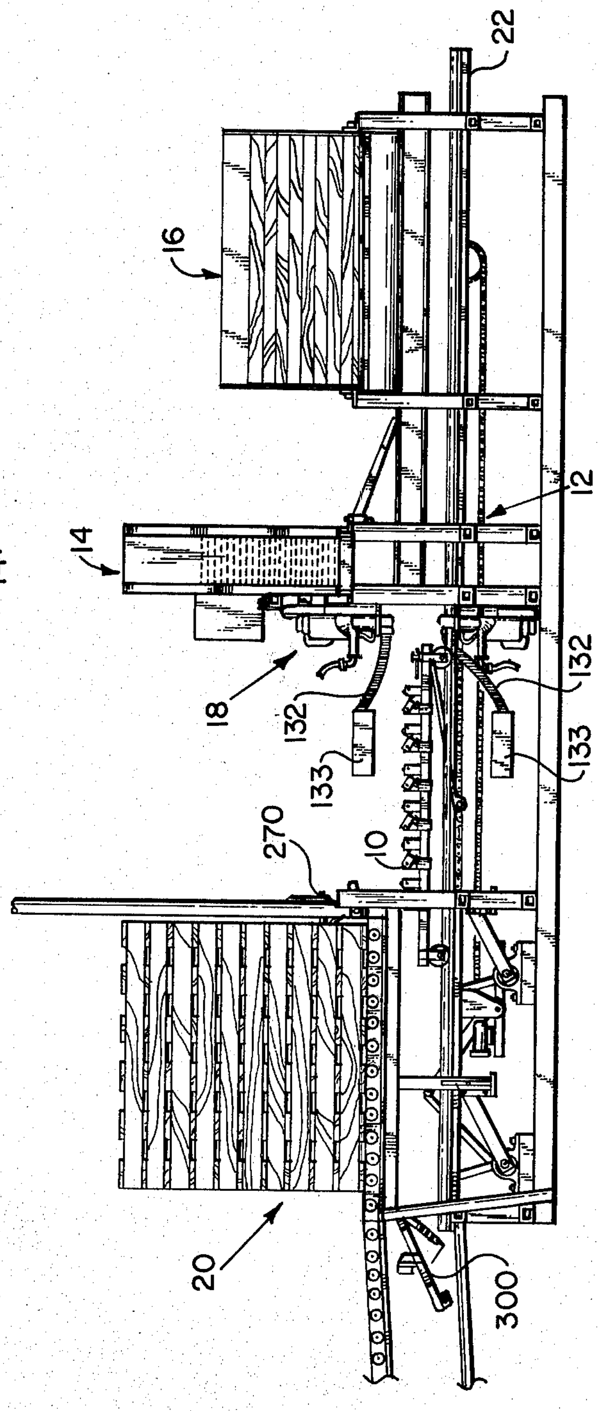
FIG. 2 is a side elevation of the pallet-making machine of FIG. 1.

FIGS. 1 and 2 show the principal elements of a pallet-making machine which provides for automatic assembly of double-sided wooden pallets.

Figure 6:
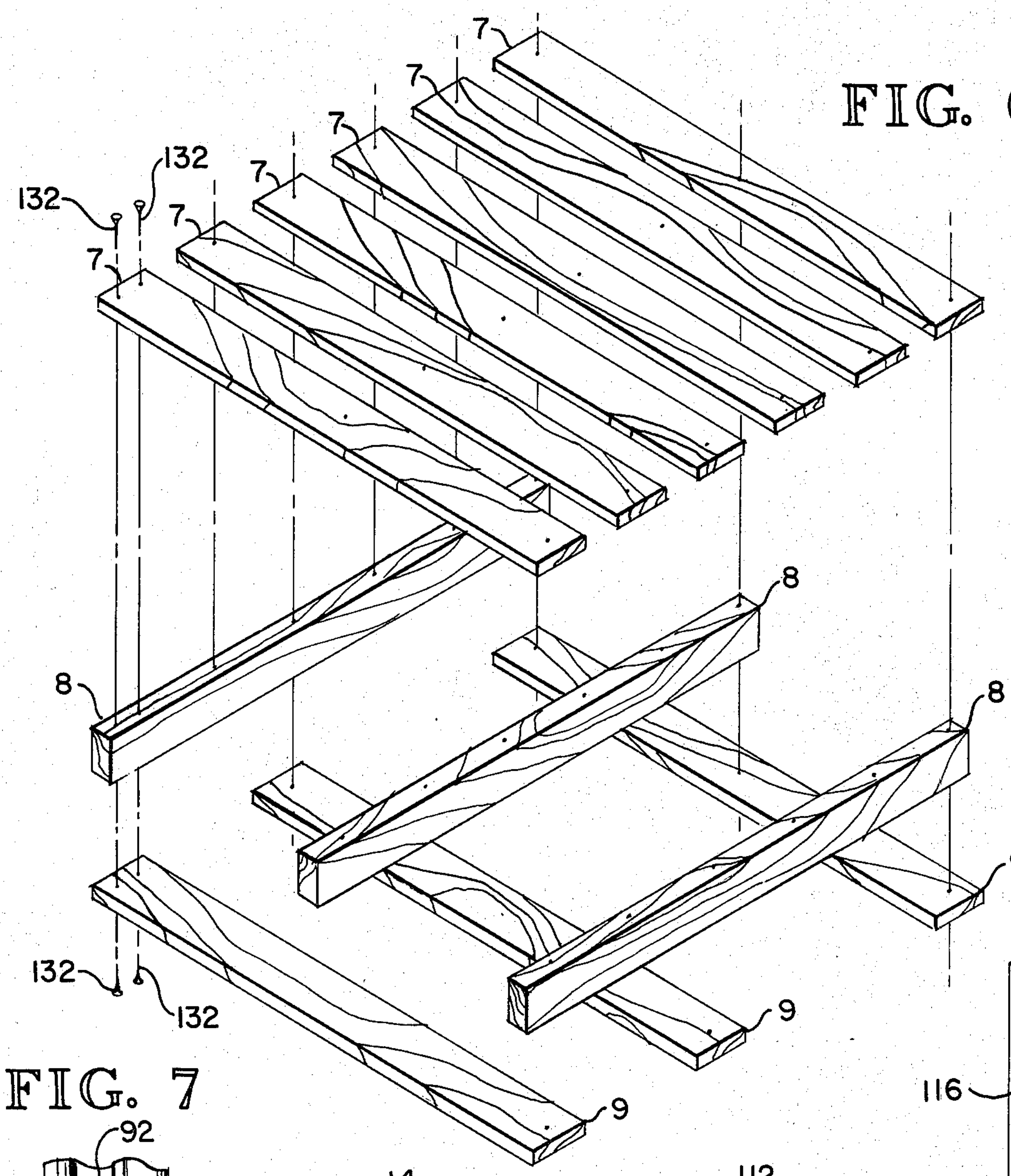
FIG. 6 is an exploded, perspective view of a double-sided pallet.

FIG. 6 shows a typical pallet having a top platform formed by a series of spaced-apart wooden slats 7 which are nailed or stapled to stringers 8 transversely laid with respect to the slats 7. The bottom platform is formed by another series of slats 9. Various types and configurations of pallets are known in the art and the described pallet-making machine is adaptable to assemble and to fasten a wide variety of pallet configurations.

With reference to FIGS. 1 and 2, a carrier 10 horizontally reciprocates with respect to a frame 12 along a pair of rails 22. Various work stations are located along the frame. A slat magazine 14 stores and dispenses slats from a vertical stack of 1×6-inch deck slat boards. A stringer magazine 16 stores and dispenses 2×4-inch stringers. A nailing station 18 is provided for fastening the slats to the stringers. A pallet-stacking station 20 removes a completed pallet from the carrier 10 and pushes it beneath a stack of completed pallets.

The Reciprocating Carrier

Figure 3:
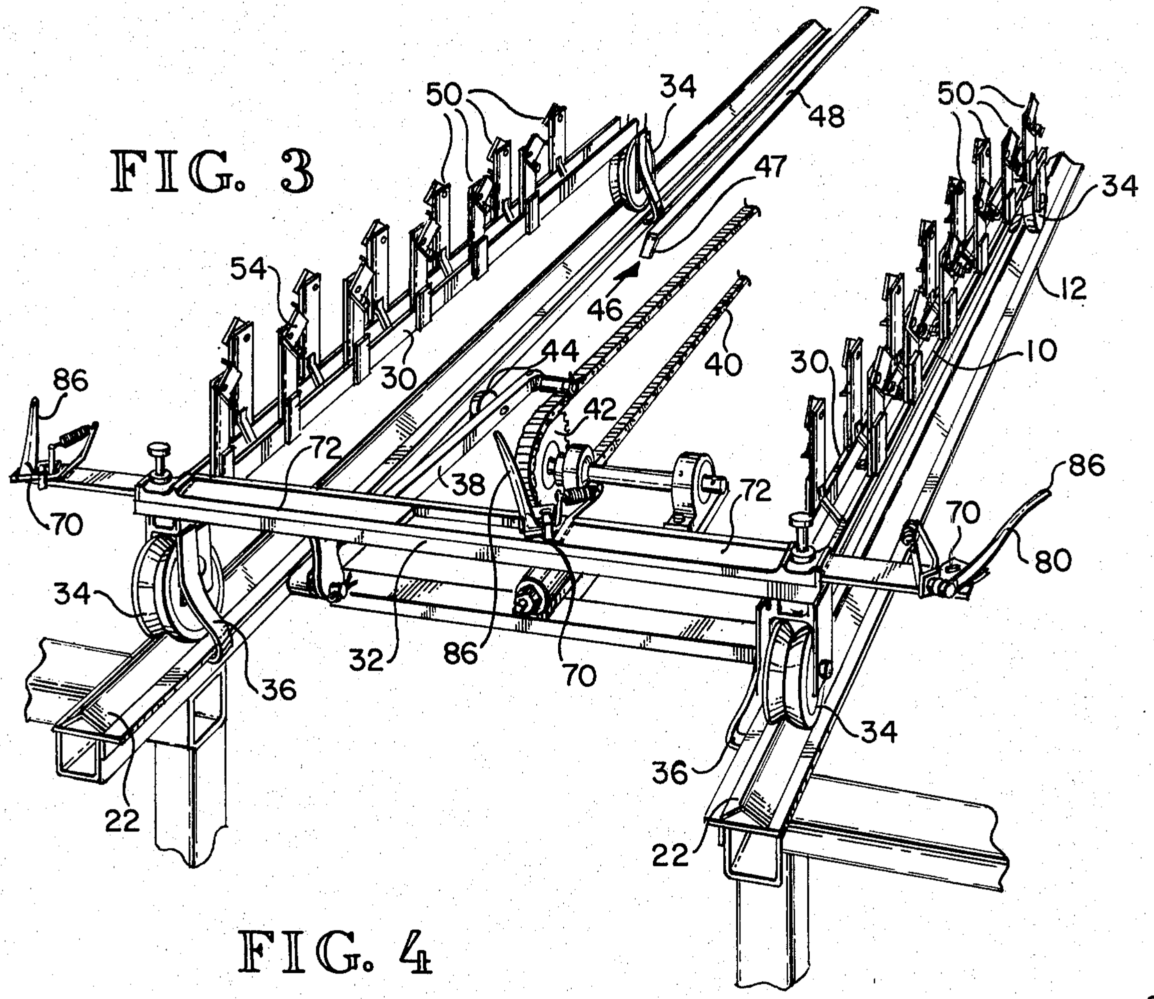
FIG. 3 is a perspective view of the pallet carrier mounted on rails.

The carrier 10, shown in FIG. 3, is designed to move along rails 22 which extend the length of the frame 12. The carrier 10 has two longitudinally extending, U-shaped side rails 30 and a cross-member 32 which connects the side rails 30. V-grooved wheels 34 are mounted near each corner of the carrier 10 and roll along the ridged top surface of the rails 22. The hooked ends of the brackets 36 which are connected to the carrier 10 slidably engage the underside of the rails 22 to hold the wheels 34 in engagement with the rails 22. A connecting arm 38 is pivotally fastened at one end to the carriage and at the other end to an endless loop roller chain 40. The chain 40 is supported by a sprocket 42 mounted to a cross-arm of the frame 12. The chain 40 is driven by a conventional gear head motor. The chain 40 moves the carrier 10 from one end to the other and back along the length of the frame 12.

A roller 44 is rotatably mounted to the connecting arm 38 near the chain 40. As the connecting arm is moved in the direction of the arrow 46 (shown in FIG. 3), the roller 44 engages the downwardly slanted near end 47 of a trip bar 48 which is pivotally mounted to the frame by a rocker arm assembly (not shown). The trip bar 48 is normally biased to an upper position, shown in FIG. 3. The roller 44 rolls along the top surface of the trip bar 48 and pushes it downwardly. The trip bar 48 actuates a conventional limit switch which operates to slow the gear head motor driving the chain 40 to approximately half-speed as the carrier passes the nailing station 18. The limit switch also signals the conventional control devices which operate the nail driving mechanism. As the carrier 10 moves in the direction shown by the arrow 46, the trip bar 48 is released when the roller 44 moves past the far end of the trip bar 48, permitting the carrier 110 to resume its normal speed. On its return, the limit switches are not actuated.

Figure 4:
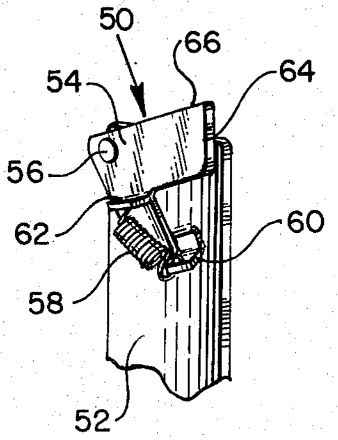
FIG. 4 is a detailed perspective view of a slat trip dog.

A plurality of one-way trip dog assemblies 50 (see FIGS. 3 and 4) are adjustably positioned along each side rail 30 in two parallel rows. The trip dog assemblies 50 include vertically extending support bars 52 which are removably secured to the side rails 30. At the top end of each of the support bars 52, pivotally fastened spring-loaded dogs 54 are positioned (as shown in FIG. 4). The dogs 54 pivot about pins 56 extending from the support bars 54. A spring 58 extends between a tab 60 on the support bar 52 and a tab 62 on the dog 54 and biases the trip dog 54 into a raised position. Pairs of trip dogs 54 (one on each side rail) engage the edges of the bottommost slat in the slat magazine 14 as the carrier 10 moves past the slat magazine. When the carrier moves in the opposite direction, the top edge 66 of the trip dog 54 is pushed downwardly by the edge of the bottommost slat, allowing the trip dog 54 to slip past the slat magazine without dispensing the slat. The slat is caught, however, by the trip dog 54' and dropped onto the carrier.

Figure 5:
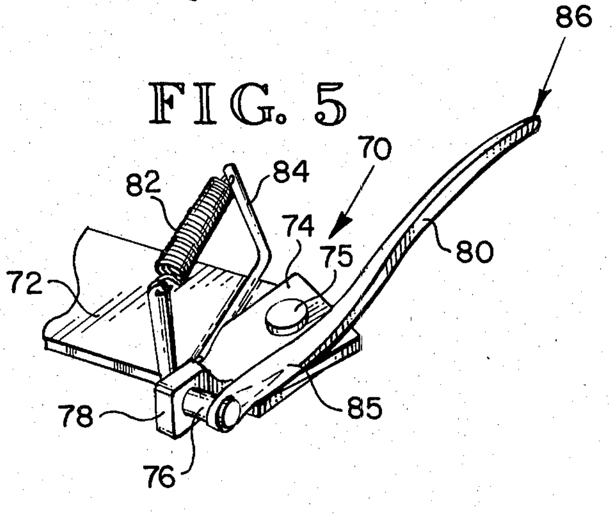
FIG. 5 is a detailed perspective view of a stringer trip lever.

FIGS. 3 and 5 show spring-loaded trip-lever assemblies 70 for one-way engagement with an end of a stringer. One assembly is attached near the middle of the carrier cross-member 32 and the others, to the ends of each of a pair of adjustably positioned slide-bars 72. Each assembly 70 includes a base plate 74 which pivots in a horizontal plane about a pin 75 fastened to the slide-bar 72. A screw-threaded axle 76 is horizontally and pivotably mounted through a threaded aperture in an extended portion 78 of the base plate 74. One end of an offset lever arm 80 is fixed to a first end of the axle 76. The axle 76 is bent upward near its middle as shown. A coil spring 82 is stretched between the upturned second end of the axle 76 and the uppermost end of a right-angled support rod 84 which is welded to the slide-bar 72 as shown. The spring 82 pulls the axle 76 so that the lower part 85 of the offset lever arm 80 is stopped against the top surface of the base plate 74. The design of the assembly 70 permits the offset lever arm 80 to pivot vertically and horizontally to slide past the stringer magazine, as will be described. After the assembly 70 clears the stringer magazine, the offset lever arm 80 snaps into the position shown in FIG. 3, permitting the free end 86 of the lever arm to engage a stringer and to dispense it endwise from a storage magazine when the carrier reverses.

The Slat Magazine

Figure 7:
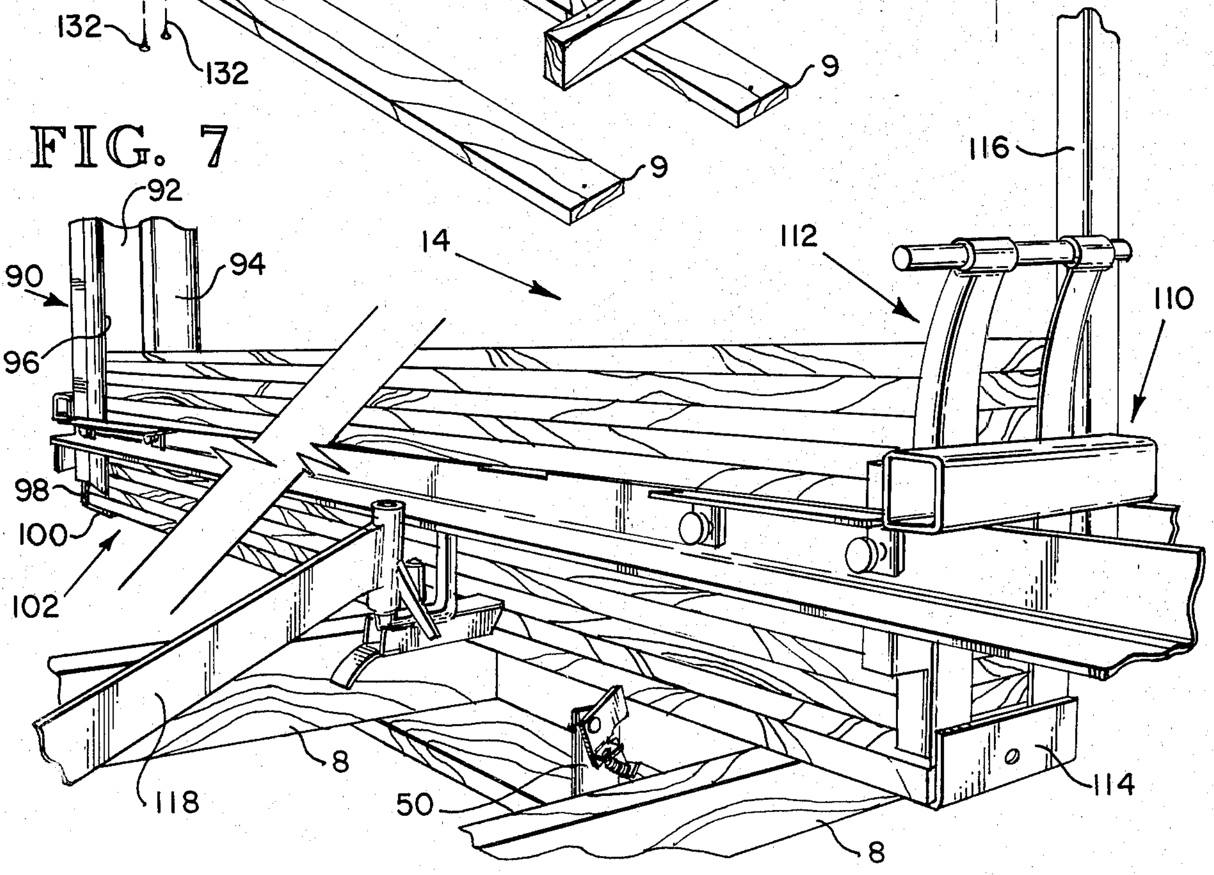
FIG. 7 is a perspective view of a slat magazine.

The magazine 14 for a stack of slats 102 (shown in FIG. 7) includes a vertically extending guide channel 90 adjustably positionable on the frame. The guide channel 90 includes a vertically extending back panel 92 and a pair of oppositely spaced side panels 94,96 which obliquely extend from the side panel 92 as shown. The lower end of the channel 90 terminates in an angle bracket 98 which extends downwardly from the lower end of the back panel 92 and which has a horizontally extending shelf portion 100 for holding the end of a deck slat.

A guide bracket 110 is adjustably positionable on the side of the machine opposite the guide channel 90. The bracket 110 has an upper end 112 which angles outwardly and a lower end terminating in an angle bracket 114 which performs the same function as the oppositely positioned angle bracket 98. A vertically extending rail 116 serves as a stop for the stack of slats 102. The angle brackets 98,114 each have clearance on each side so that a slat may be horizontally removed from the bottom of the vertical stack of slats 102 by a pair of trip dog assemblies 50. A pair of guide bars 118 push a slat downwardly after the slat is dispensed from the stack.

In operation, as the carrier 10 moves beneath the slat magazine 14, a one-way trip dog assembly 50 on each side rail 30 (as shown in FIG. 3) engages the bottom slat of the stack 102 and pushes the slat onto the carrier 10. Some assemblies 50 along the length of the carrier 10 are arranged to dispense slats as the carrier moves in a forward direction, while other assemblies 50 are arranged to dispense slats when the carrier 10 moves in the reverse direction. The movement of the carrier 10 in the forward direction dispenses slats for the bottom deck of a pallet, while movement of the carrier 10 in the reverse direction dispenses slats for the top deck.

Figure 18:
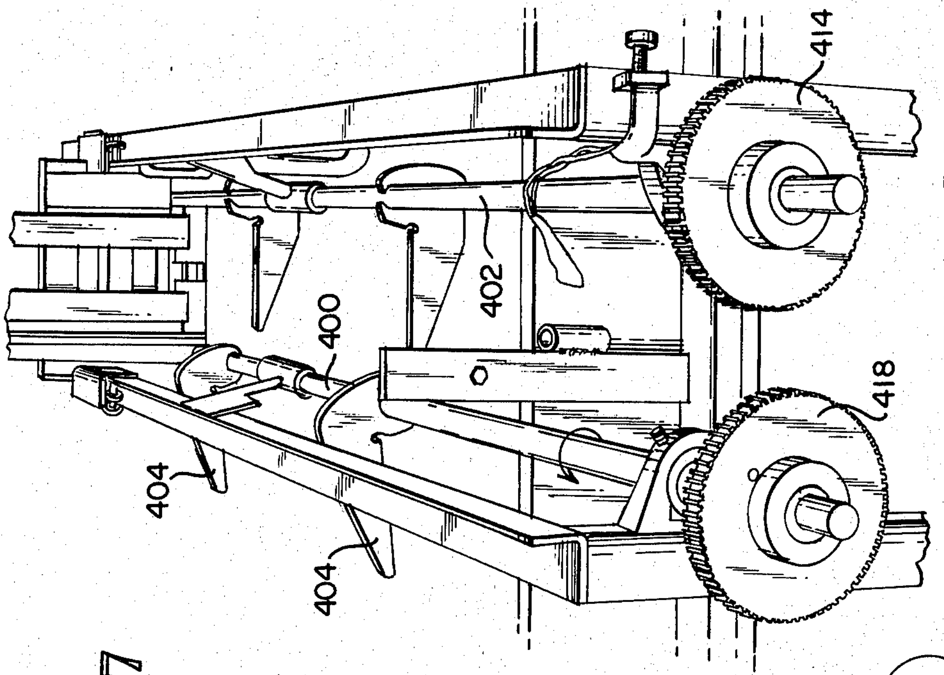
FIG. 18 is a perspective view of the arms and gears of an alternate slat magazine.
Figure 17:
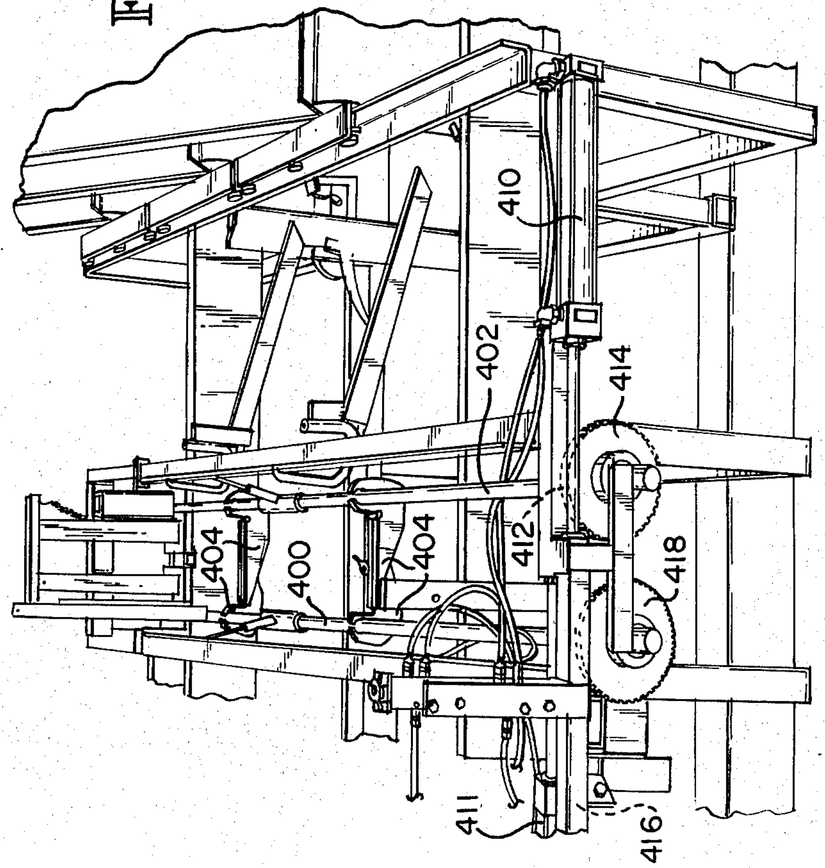
FIG. 17 is a perspective view of an alternate slat magazine.
Figure 19:
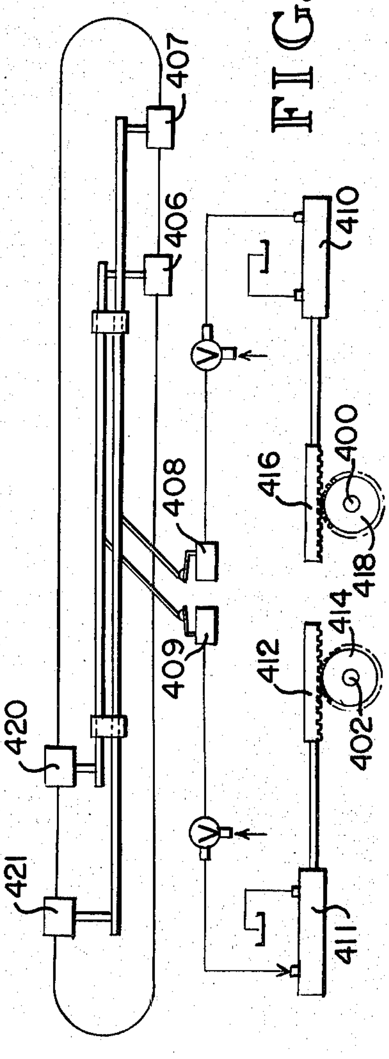
FIG. 19 is a schematic of the operation of a slat magazine.

An alternate means for dispensing slats is shown in FIGS. 17–19. Two shafts 400 and 402 extend substantially perpendicular to the carrier's movement. Each shaft 400 or 402 has a plurality of crescent-shaped arms 404 projecting from it. The arms 404 on shaft 400 are designed to extend toward the right in their operative position, while the arms of shaft 402 extend toward the left. The arms 404 hold a stack of slats when in the operative position and allow slats to be slid from the stack in the directions in which they extend. The arms 404 on shaft 400 are slightly offset from those on shaft 402 so that both sets of arms may contact the bottom slat of the stack simultaneously (as shown in FIG. 17).

In operation, the slats lie on the arms 404 of shaft 400. The carrier 10 moves toward the right to engage slats for the bottom deck. When the carrier 10 reaches the stringer magazine assembly 16, the roller 44 engages a trip bar 406 which activates a limit switch 409 to turn shaft 402. The turning is coordinated as follows (FIG. 19). The limit switch activates a pneumatic cylinder 411 which draws rack 412 to the left to turn gear 414. Gear 414 is keyed to shaft 402 and turns the arms to contact the bottommost slat. Simultaneously with that contact, the roller contacts a second trip bar 407 to activate a limit switch 408, pneumatic cylinder 410, rack 416, and gear 418 to turn shaft 400. As the carrier 10 returns through the slat magazine, a top deck of slats is dispensed. At the nailing station 20, a second set of trip bars 420 and 421 is contacted, which activates the limit switches to reverse the process just described. Thus the arms of shaft 400 recontact the slats, while the arms of shaft 402 rotate out of the way.

The Stringer Magazine Assembly

Figure 8:
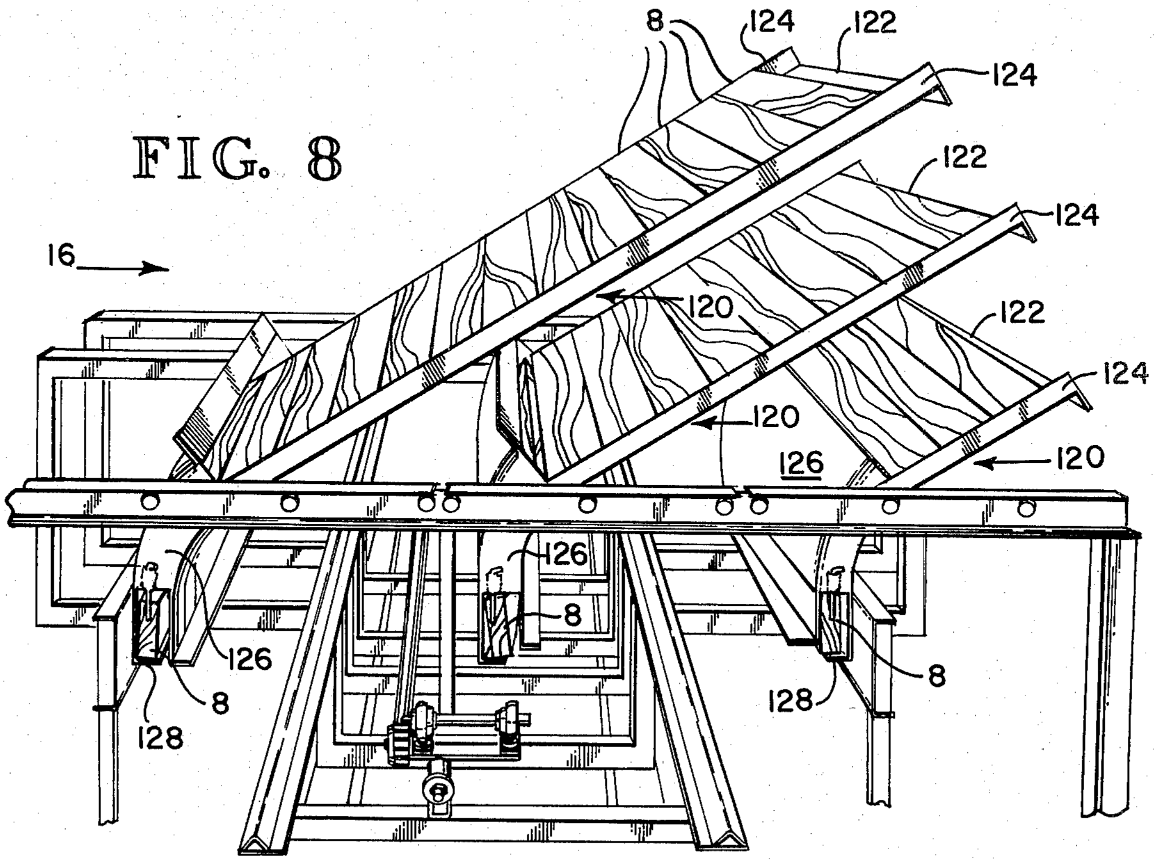
FIG. 8 is an end perspective view of the stringer magazines for the pallet-making machine.
Figure 9:
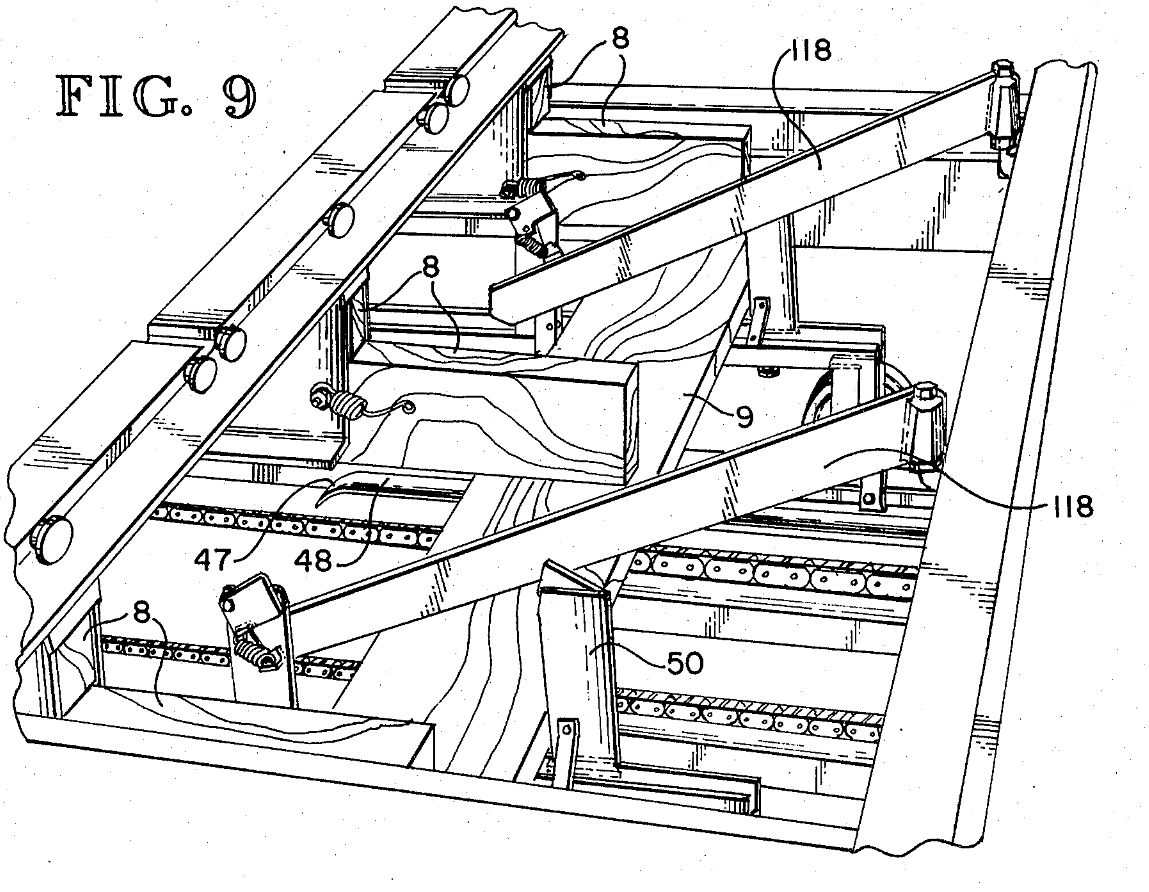
FIG. 9 is a perspective view of the portion of the pallet machine between the slat magazine and the stringer magazines.

FIG. 8 shows a stringer magazine assembly 16 which includes three chutes 120. Each chute 120 is designed to be loaded with a plurality of 2×4 stringers. A chute 120 includes an inclined feed table 122 which has upturned side rails 124 formed along its front and back edges. Stringers 8 are positioned with their ends adjacent the rails 124 and with their wider sides lying against the inclined table 122. The stringers 8 slide by gravity into a curved throat portion 126. At the bottom end of the throat 126, an inwardly extending lip 128 supports a narrower side of the bottom stringer.

In operation, as the carrier 10 moves forward past and beneath the stringer magazine, the offset lever arms 80 spring back until the carrier reaches the far end of the assembly. The lever arms 80 then recoil so that their free ends 86 can engage the ends of the lower stringers 8 in the respective magazines. As the carrier 10 moves in the reverse direction, each lever arm slips along the opening slot provided by the lip 128 to draw a stringer 8 out of each chute. The stringers 8 are longitudinally aligned on their narrower sides along the direction of motion of the carrier 10 transverse to the bottom slats 9.

The Nailing Apparatus

Figure 10:
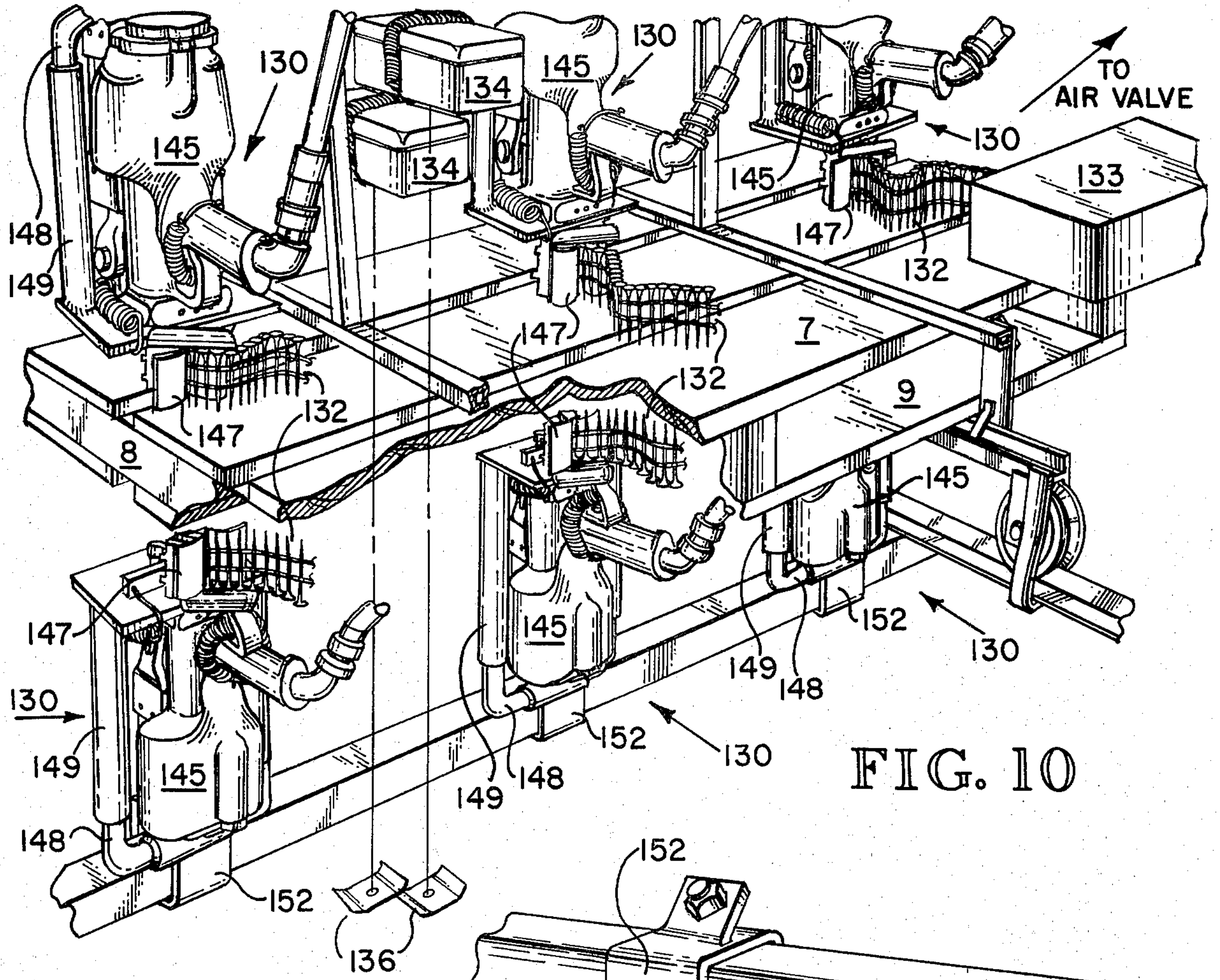
FIG. 10 is a perspective view of the automatic nailing station for a pallet.
Figure 11:
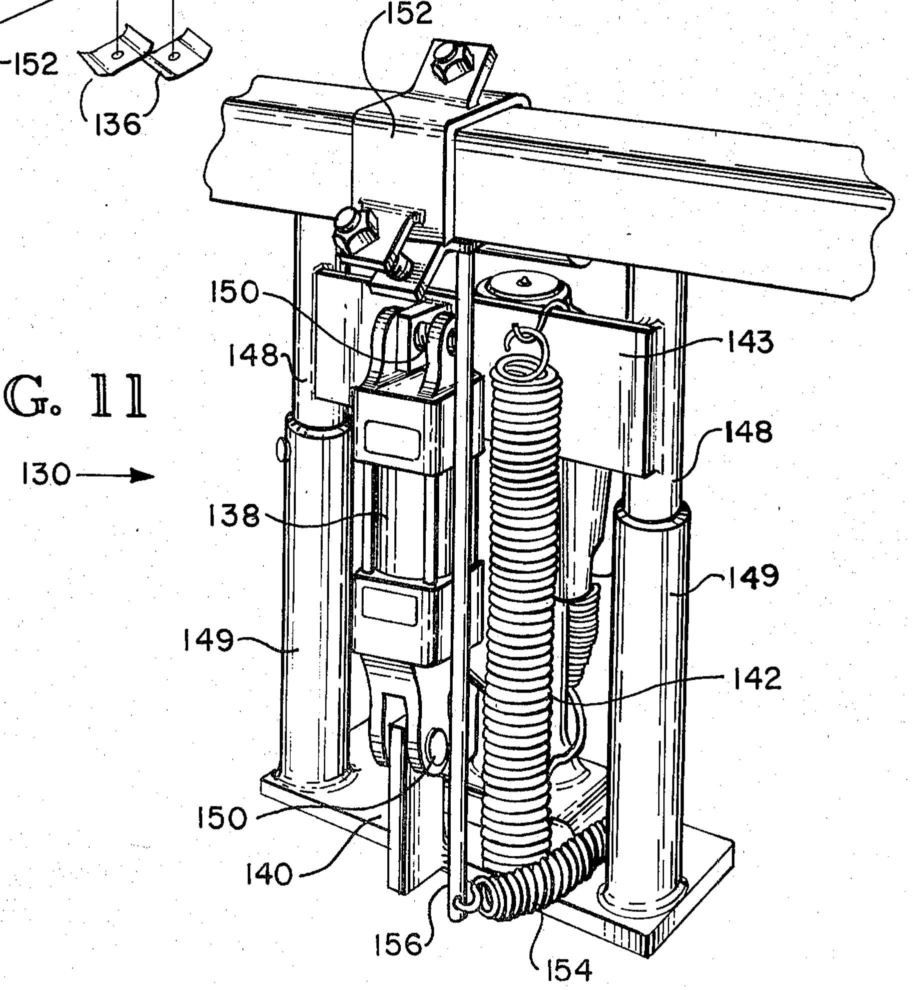
FIG. 11 is a perspective view of a nailing gun support mechanism.

As shown in FIG. 10, a nailing station 18 includes a plurality of pneumatically operated nailing gun assemblies 130 for driving nails 132 through upper slats 7 and lower slats 9. The assemblies 130 are positioned on opposite sides of a series of stringers 8. The nails 132 are attached to tapes to form chains which are contained in magazines 133. The nails 132 are automatically dispensed by the nail guns. Each of a pair of conventional light source/receiver modules 134 is positioned above the path traversed by a pallet. Each module projects a light beam onto a mirror 136 located below. The light beam is reflected back from the mirror 136 to the module 134. A pallet interrupts the light beam to activate conventional pneumatic control devices (not shown) for a plurality of air-operated cylinders 138. The pneumatic control devices are armed initially by the roller 44 depressing the trip bar 48, shown in FIG. 3. Each cylinder 138 moves a vertically movable support plate 140 against the biasing force provided by a spring 142 (which is connected at one end to the movable support plate 140 and at the other end to a fixed support bracket 143). Each movable support plate 140 has a conventional pneumatically operated nail gun 145 mounted thereon which is actuated when its head 147 contacts the surface of a slat. The nail guns 145 are guided by a pair of rods 148 which slide within cylindrical guides 149 fixed to the movable support bracket 140. Each end of the cylinder 138 is respectively coupled to the plate 140 and the bracket 144 by a pin 150. The cylinder 138 is operated by air from a pressure source controlled by the light source/receiver modules 134. As shown in FIG. 10, the rods 148 are pivotally mounted to a bracket assembly 152 which permits the nailing gun assemblies 130 to pivot if a jam develops. A spring 154, attached between a rod 156 fixed to the frame and the plate 140, provides a biasing force to keep the nailing guns 145 vertically aligned.

In operation, a series of nails 132 are inserted into the top and bottom sides of a pallet. The nailing guns 145 are moved into contact with the top slat 7 and bottom slat 9 of a pallet by means of the air cylinders 138, controlled by the light source/receiver modules 134. The carrier 10 is slowed to approximately half-speed as the carrier passes through the nailing station in the direction of the arrow 46 shown in FIG. 3.

Pallet Stacker

Figure 12:
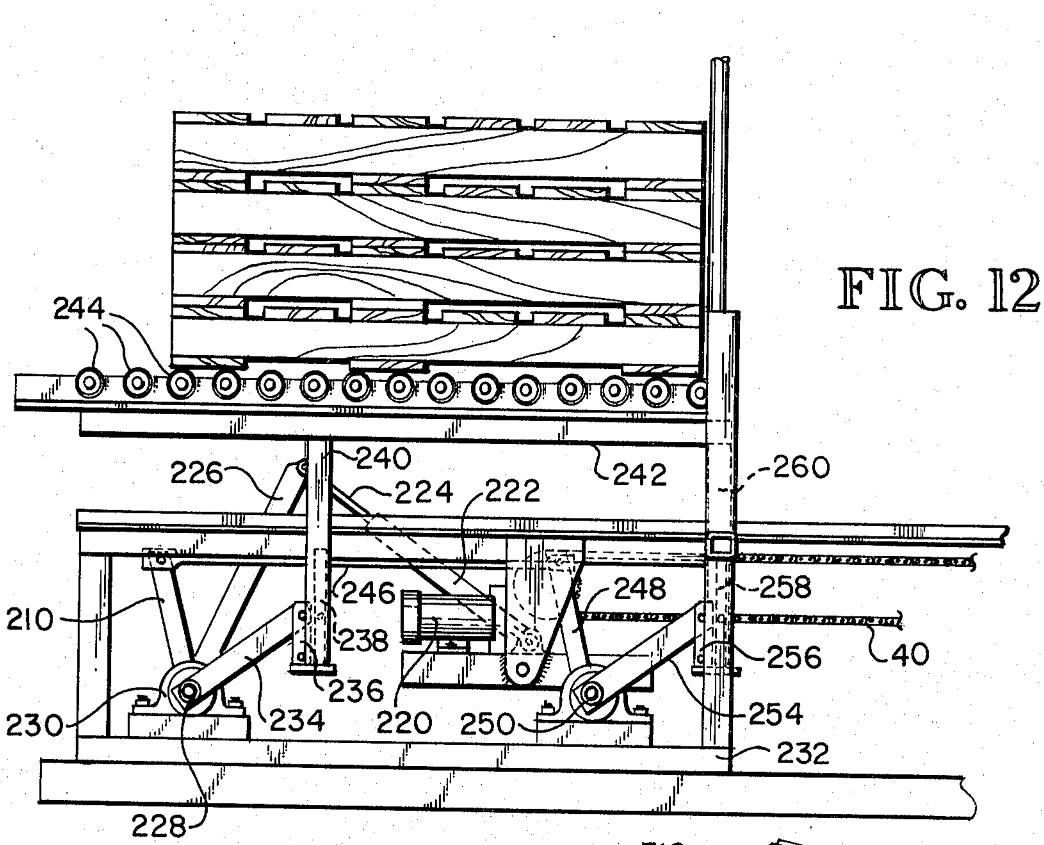
FIG. 12 is a side elevation of a pallet ejector and stacking mechanism.
Figure 15:
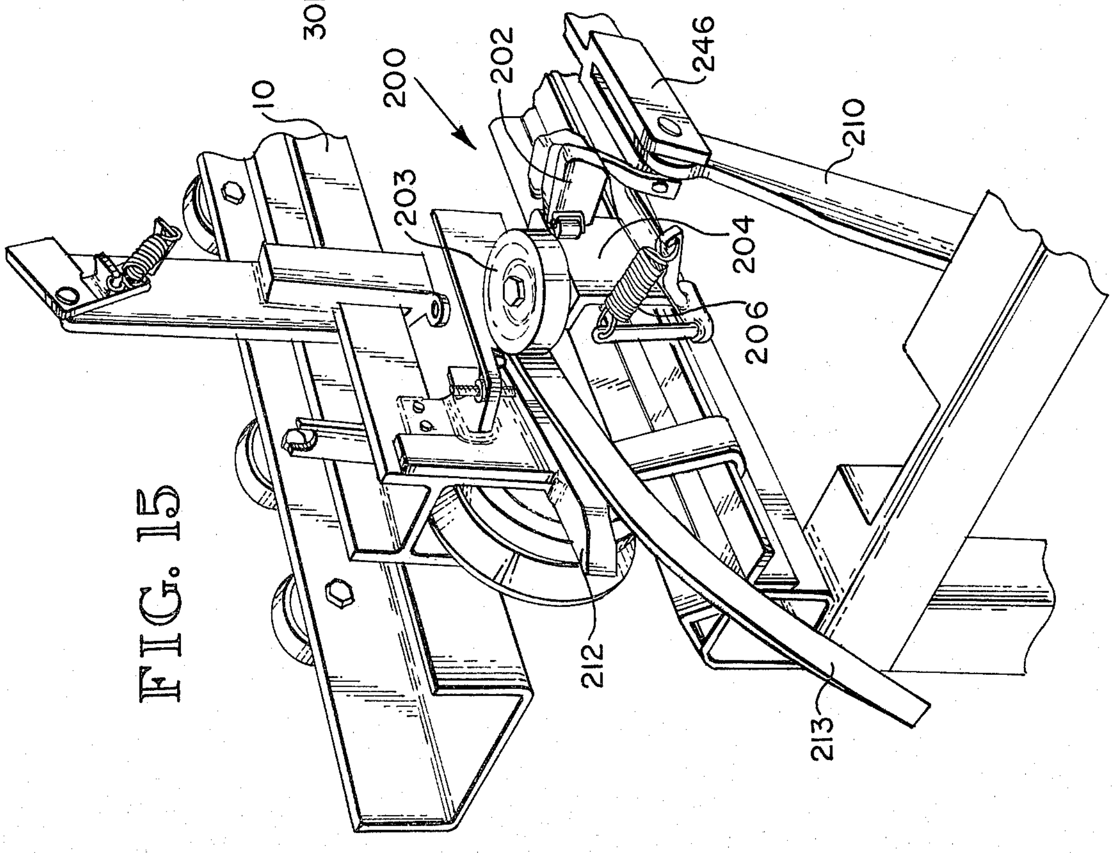
FIG. 15 is a perspective view of a switch actuator operated by the pallet-stacking mechanism.

After the pallet components have been nailed together at the nailing station 18, the carrier, with a completed pallet thereon, moves to the stacking station 20, shown in FIG. 12. A carrier-sensing switch assembly 200, shown in FIG. 15, includes an electrical assembly switch 202 and a roller 203 which is mounted on a pivotable bracket 204 biased by a spring 206 away from the switch 202. The entire assembly is mounted to move with the end of a connecting arm 210. As the carrier 10 moves to the end of the rails, a cam bar 212 horizontally fixed to the carrier 10 engages the roller 203 and pushes the roller so that the pivotable bracket 204 contacts and actuates the electrical switch assembly 202. The electrical switch assembly 202, when actuated, disables the gear head motor 220 (shown in FIG. 12), which drives the roller chain 40 connected to the carrier 10. The switch 202 also activates a solenoid-operated air valve (not shown) which controls the operation of an air cylinder 222 which causes the connecting arm 210 to pivot toward the end of the pallet-making machine. The roller 203 moves in an arc on the end of the arm 210 and rolls along a curved bar 213. When the roller moves past the end of the bar 213, the roller 203 and the bracket 204 are biased away from the roller switch assembly 202, the air supply to the air cylinder 222 is cut off, and the gear head motor 220 is again activated to move the carrier 10.

The air cylinder 222 has a piston rod 224 which is pivotally pinned to one end of a lever arm 226. The other end of the lever arm 226 is perpendicularly fixed to a horizontal shaft 228 which is journaled near each end by bearing assemblies 230 attached to the lower frame members 232 of the machine. The connecting arm 210 is fixed to the horizontal shaft 228, which is turned by the air cylinder 222. Fixed to each end of the shaft 228 is one end of a pair of elevating arms 234. The other end of each elevating arm 234 is pivotally pinned to one end of a pair of brackets 236, which have a guide rod 238 attached thereto. Each guide rod 238 fits within a guide cylinder 240 which is vertically aligned and fastened to a pallet elevating frame 242. The frame 242 has a series of rollers 244 fastened along each side, which rollers 244 engage the bottom deck of a pallet. The connecting arm 210, shown in FIG. 12, is pinned at its free end to one end of a horizontal connecting rod 246. The other end of the horizontal connecting rod 246 is pinned to the free end of a second connecting arm 248. The other end of the arm 248 is perpendicularly fastened to a second horizontal shaft 250, which has elevating arms 254 fixed at each end. Each of another pair of brackets 256 is pivotally pinned to one of the elevating arms 254, and the brackets 256 are each attached to another one of a pair of guide rods 258 which fit within guide cylinders 260 attached to the pallet elevating frame 242. The connecting rod 246 couples the two shafts 228,250 together for movement so that as the air-cylinder rod 224 is extended, the pallet elevating frame 242 is moved vertically. When the air-cylinder rod 224 is extended, the rollers 244 engage the bottom of a pallet and lift the pallet from the carrier 10. The switch 202 and the bracket 204 mounted at the end of the connecting rod 246 move in an arc when the air cylinder 222 is operated. When the roller 203 moves past the end of the bar 213, the air supply to the air cylinder 222 is cut off and the pallet elevating frame 242 returns to its lowered position.

Figure 14:
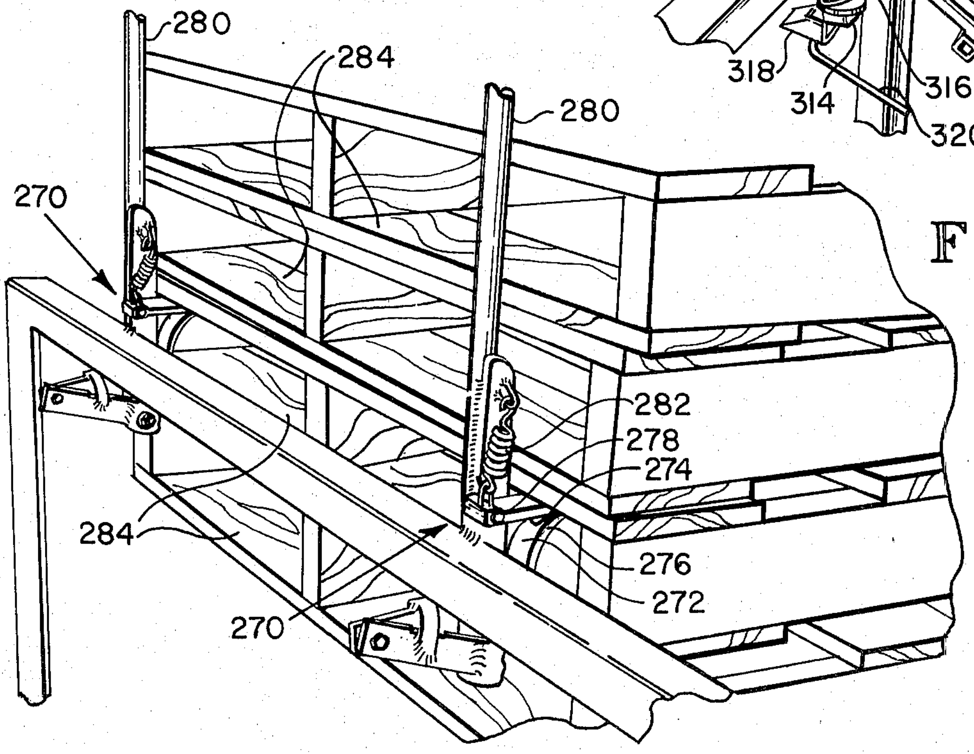
FIG. 14 is a detailed perspective view of a pair of inside pallet-stacking ratchets.

Each pallet removed from the carrier 10 is pushed into the bottom position in a stack of pallets, as shown in FIG. 12. A pair of inside ratchet mechanisms 270 (see FIG. 14) are welded to a cross-member of the machine frame. Each ratchet mechanism 270 includes a catcher assembly 272 which includes a step portion 274 and a curved guide portion 276. The catcher assembly 272 pivots about a pin 278 which is fixed to a stacker guide rod 280. The catcher assembly 272 is biased by a spring 282 so that the step portion 274 is normally in a horizontal position. The step 274 engages the bottom pallet in the stack and rests against one of the slat faces. One half of the entire pallet stack is supported by the inside ratchet mechanisms 270. When a new pallet is pushed up into the bottom position in the stack, the edges of the outside slats 284 of a pallet engage the curved guide 276 and pivot the free end of the step 274 upwardly until it clears the pallet. The ratchet mechanism 270 is then biased back to a position beneath the pallet 284. When the pallet elevating frame 242 returns to a lowered position, the pallet is supported on the steps 274, as shown in FIG. 14.

Figure 13:
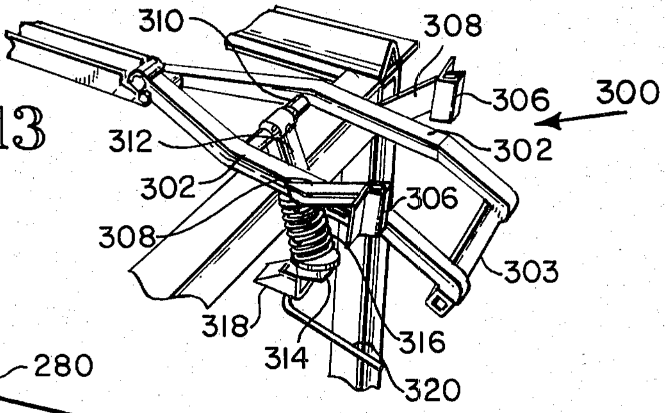
FIG. 13 is a detailed perspective view of an outside pallet-stacking ratchet shown in a disengaged position for removing a stack of pallets from the stacker.
Figure 16:
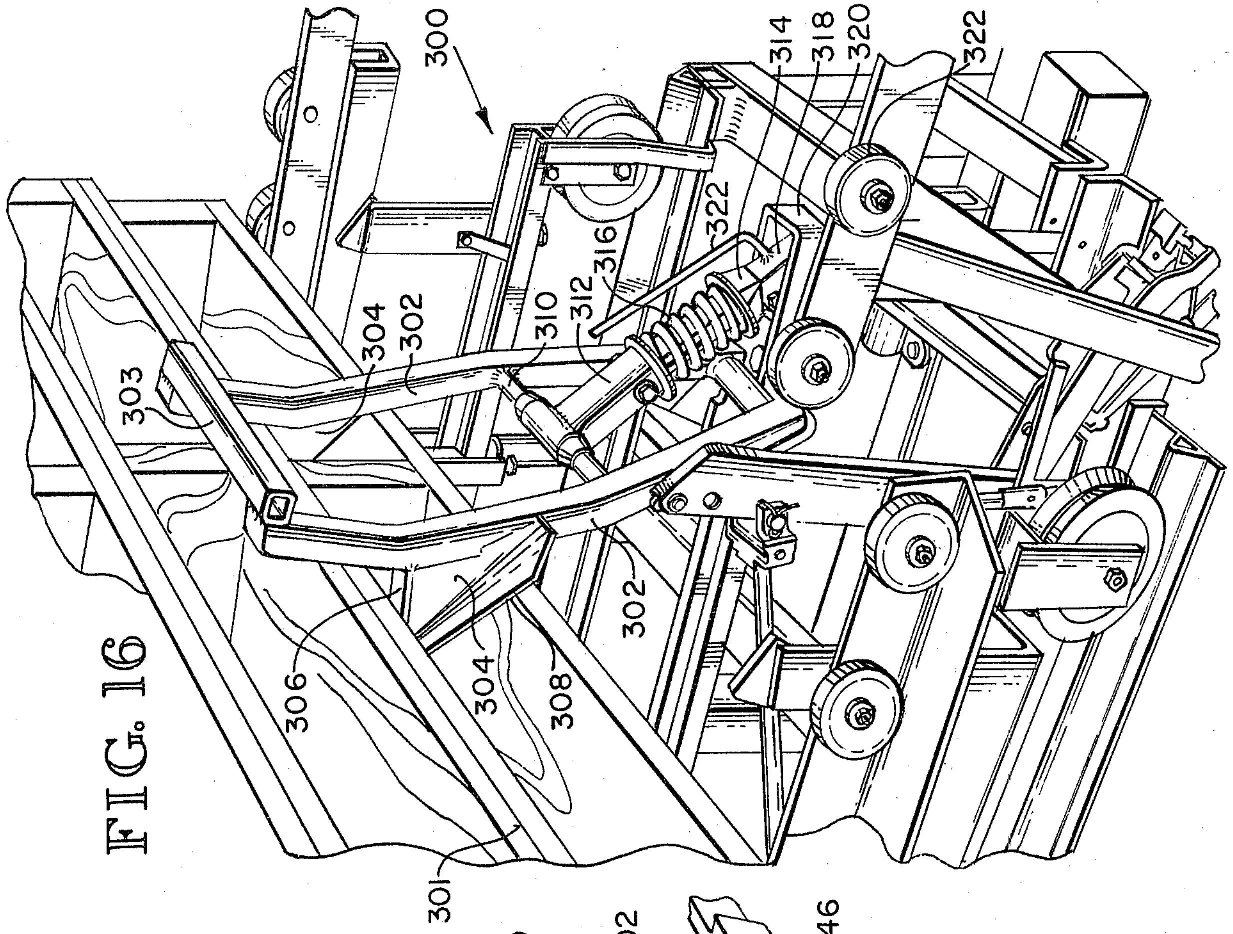
FIG. 16 is a detailed perspective view of an outside pallet-stacking ratchet.

FIGS. 13 and 16 show an outside ratchet mechanism 300 provided for supporting the outside half of the pallet stack. A pair of elongated arm members 302 are held in a spaced-apart relationship by a transverse brace 303. FIG. 13 shows the members 302 pivotably attached at their lower ends to the machine frame. A catcher bracket 304 attached to each arm member 302 includes a step portion 306 and an inclined ramp portion 308. A transverse post 310 is attached between the midportions of the arm members 302 and has one end of a pusher arm 312 journaled to it. The pusher arm 312 includes a telescopically slidable portion 314 which is outwardly biased by a concentric compression spring 316. The end of the slidable portion 314 has an end block 318 which pivots inwardly (as shown in FIG. 13). The end block 318 engages a pocket 320 formed in the frame. A handle 322 is attached to the end block 318. When the end block 318 is engaged in the pocket 320 (as shown in FIG. 16), the spring 316 biases the arm members 302 against the pallet stack. As a new pallet is pushed up into the bottom position in the stack, the arms 302 are pivoted outwardly by the slats riding against the inclined ramps 308. When the stack is lowered, the steps 306 support the pallet stack. When it is desired to remove a stack of pallets from the stacker, the stack of pallets is raised away from the ratchet steps 276, 306 and the handle 322 is operated to pivot the end block 318 (shown in FIG. 13) out of the pocket 320. The arms 302 are then moved from their upright orientation (as shown in FIG. 16) to a substantially horizontal orientation (as shown in FIG. 13), and the pallet stack is rolled away onto a handling frame or the like.

While particular embodiments of the invention have been shown and described, the invention is not to be limited thereto since many modifications to it may be made. This application covers all modifications that fall within the true spirit and scope of the basic underlying principles disclosed and claimed.

I claim:

1. An automatic pallet-making machine for assembling a pallet from slats and stringers, comprising:

a movable carrier on which a pallet is automatically assembled;

a slat magazine;

slat dispensing means for serially dispensing slats onto the carrier from the slat magazine as the carrier passes the slat magazine;

a stringer magazine;

stringer dispensing means for dispensing stringers from the stringer magazine transversely onto the slats previously dispensed onto the carrier;

fastening means for automatically fastening the slats and stringers together on the carrier to form an assembled pallet;

a track running between the slat magazine and stringer magazine upon which the carrier moves with a reciprocating motion; and means for reciprocally driving the carrier along the track so that a first series of slats are dispensed on the carrier as it moves in a forward direction to form a bottom deck for a pallet, stringers are then dispensed onto the first series of slats on the carrier by the stringer dispensing means, and a second series of slats is dispensed onto the stringers as the carrier moves in a reverse direction past the slat magazine and slat dispensing means.

2. The machine of claim 1 wherein the slat dispensing means includes a plurality of trip dogs spaced in pairs on side rails of the carrier, each pair of trip dogs engaging the bottom slat held in the slat magazine to dispense a slat when the carrier moves in one direction, but slipping past the bottom slat when the carrier moves in the opposite direction.

3. The machine of claim 1 wherein the stringer dispensing means includes a plurality of one-way trip levers mounted to the carrier for engagement and removal of stringers from the stringer magazine when the direction of movement of the carrier is reversed.

4. The machine of claim 1 wherein the slat magazine includes means for holding a stack of slats so as to provide access to the bottom slat for slidable removal of the bottom slat onto the carrier.

5. The machine of claim 4 wherein the holding means includes a shelf for supporting a portion of the bottom slat in the stack and providing access to the bottom slat for the slat dispensing means.

6. The machine of claim 4 wherein the slat magazine includes a first shaft with first arms extending in one direction from the first shaft, a second shaft with second arms extending in the opposite direction to the first arms, and means to rotate the shafts so that alternately one set of arms hold the slats, allowing slats to be dispensed in the direction that the arms extend.

7. The machine of claim 1 wherein the stringer magazine includes a plurality of shelves supporting more than one serial arrangement of stringers and providing access for removal of the bottom stringer of each serial arrangement by the stringer dispensing means.

8. The machine of claim 1 wherein the fastening means includes (i) sensing means for detecting the presence of a carrier having a partially assembled pallet thereon, and (ii) fastener drivers adapted to be actuated by the sensing means to drive fasteners into the partially assembled pallet on the carrier.

9. The machine of claim 7, including mounting frames on which the fastener drivers are mounted for reciprocal movement with respect to the partially assembled pallet on the carrier.

10. The machine of claim 1, including means for driving the carrier at a given speed.

11. The machine of claim 10 wherein the means for driving the carrier includes means for operating the carrier at a reduced speed during the time that the fastening means are operated to form an assembled pallet.

12. The machine of claim 1, including an elevator positioned past the fastening means for automatically removing an assembled pallet from the carrier and pushing the assembled pallet into the bottom position of a stack of assembled pallets.

13. The machine of claim 12 wherein the elevator includes a linkage and an ejector frame operated by the linkage to remove an assembled pallet from the carrier.

14. The machine of claim 12, including a ratchet mechanism for supporting the stack of pallets in a position above the elevator.

15. An automatic pallet-making machine for assembling a pallet from a series of slats and stringers, comprising:

a carrier on which the pallet is automatically assembled;

means for reciprocally moving the carrier along a predetermined travel path;

a slat magazine holding a stack of slats positioned above the carrier and intermediate the ends of the predetermined travel path;

a stringer magazine at one end of the predetermined travel path holding a plurality of serially arranged stringers with their length dimension transverse to the length dimension of the slats;

slat dispensing means mounted at spaced intervals along the length dimension of the carrier programmable to dispense a plurality of slats at spaced intervals on the carrier from the bottom of the stack of slats held by the slat magazine as the carrier moves in one direction beneath the slat magazine;

stringer dispensing means mounted on the carrier for removing a stringer from each of the serially arranged stringers onto and transverse to the previously dispensed slats on the carrier in reverse of the direction of movement of the carrier; and fastening means for automatically fastening the slats and stringers together on the carrier to form an assembled pallet.

16. The machine of claim 15 wherein the slat dispensing means is programmed to dispense slats at spaced intervals onto the stringers to form a double-sided pallet as the carrier is moved beneath the slat magazine a second time in a direction opposite the one direction.

17. The machine of claim 15, including stacking means at the end of the predetermined travel path opposite the stringer magazine for removing an assembled pallet from the carrier prior to reversal of movement of the carrier.

18. The machine of claim 15 wherein the fastening means are positioned intermediate the stacking means and slat magazine.

19. The machine of claim 15 wherein the slat magazine includes (i) a pair of rotatable, spaced shafts, each shaft having arms to hold slats yet to allow a slat to slide from the arms in one direction, and (ii) means to rotate the shafts to change the orientation of the arms holding the slats.

20. The machine of claim 19 wherein the means to rotate include (i) a plurality of trip bars responsive to the position of the carrier; (ii) a plurality of limit switches operatively associated with the trip bars; and (iii) means to turn the shafts when activated by the limit switches.

21. The machine of claim 20 wherein the means to turn the shafts includes (i) a first pneumatic cylinder having a piston; (ii) a first rack coupled to the piston of the first cylinder; (iii) a first gear meshed with the rack and keyed to one shaft; (iv) a second rack; (v) a second gear meshed with a second shaft; and (vi) a second pneumatic cylinder having a piston coupled to the second rack, wherein a signal from the trip bar activates a limit switch to compress the first cylinder, drawing the first rack over the gear to swing the arms on the shaft into contact with the slats and a second signal causes the second shaft to rotate its arms out of the way.

22. A method for automatically forming a double-sided pallet from slats and stringers, comprising the steps of:

serially dispensing a first plurality of slats onto a reciprocating carrier to form a lower deck of the pallet when the carrier moves in a first direction;

dispensing a plurality of stringers onto the first plurality of slats forming the lower deck of a double-sided pallet when the carrier moves in said first direction;

dispensing a second plurality of slats onto the stringers to form an upper deck when the carrier moves in a second direction; and then automatically fastening the slats forming the upper and lower decks to the stringers, without flipping the partially formed pallet of slats and stringers, to form an assembled pallet.

23. The method of claim 22 wherein the steps of serially dispensing the first and second pluralities of slats includes engaging the edges of the slats with one-way trip dogs mounted to the carrier.

24. The method of claim 22 wherein the step of dispensing the plurality of stringers includes engaging the ends of the stringers with a one-way trip lever which dispenses the stringers so as to lie transverse to the first plurality of slats on the carrier.

25. The method of claim 22 wherein the step of automatically fastening the slats to the stringers includes the steps of sensing the presence of a partially assembled pallet on the carrier and driving fasteners in response thereto.

26. The method of claim 22, including the step of automatically removing an assembled pallet from the carrier by lifting the assembled pallet from the carrier.

27. The method of claim 22, including the steps of pushing an assembled pallet into the bottom position of a stack of assembled pallets and holding the stack.

* * * * *